(12) United States Patent
Tuttle

(10) Patent No.: US 7,777,630 B2
(45) Date of Patent: Aug. 17, 2010

(54) METHODS AND SYSTEMS OF RFID TAGS USING RFID CIRCUITS AND ANTENNAS HAVING UNMATCHED FREQUENCY RANGES

(75) Inventor: John R. Tuttle, Boulder, CO (US)

(73) Assignee: Round Rock Research, LLC, Mount Kisco, NY (US)

( * ) Notice: Subject to any disclaimer, the term of this patent is extended or adjusted under 35 U.S.C. 154(b) by 306 days.

(21) Appl. No.: 11/828,813

(22) Filed: Jul. 26, 2007

(65) Prior Publication Data

US 2009/0027168 A1   Jan. 29, 2009

(51) Int. Cl.
G08B 13/14 (2006.01)
(52) U.S. Cl. .................. 340/572.7; 340/572.1; 343/860
(58) Field of Classification Search ............... 340/572.7, 340/572.1, 572.8, 10.1, 10.2, 10.4; 343/860, 343/700 MS, 741, 745, 757, 853; 342/51
See application file for complete search history.

(56) References Cited

U.S. PATENT DOCUMENTS

| | | | |
|---|---|---|---|
| 3,569,976 A | 3/1971 | Korvin et al. | |
| 3,733,608 A | 5/1973 | McGhay et al. | |
| 3,745,568 A | 7/1973 | Works et al. | |
| 3,745,569 A | 7/1973 | Works et al. | |
| 4,075,632 A | 2/1978 | Baldwin et al. | |
| 4,173,019 A | 10/1979 | Williams | |
| 4,623,874 A | 11/1986 | Thoma | |
| 4,630,044 A | 12/1986 | Polzer | |
| 4,692,769 A | 9/1987 | Gegan | |
| 4,926,182 A | 5/1990 | Ohta et al. | |
| 4,963,887 A | 10/1990 | Kawashima | |
| 5,023,866 A | 6/1991 | De Muro | |
| 5,053,774 A | 10/1991 | Shcuermann et al. | |
| 5,081,458 A | 1/1992 | Meunier | |
| 5,084,699 A | 1/1992 | DeMichele | |
| 5,119,099 A | 6/1992 | Haruyama et al. | |
| 5,164,985 A | 11/1992 | Nysen et al. | |
| 5,182,570 A | 1/1993 | Nysen et al. | |
| 5,320,561 A | 6/1994 | Cook et al. | |
| 5,374,930 A | 12/1994 | Shcuermann | |
| 5,446,447 A | 8/1995 | Carney et al. | |
| 5,448,110 A | 9/1995 | Tuttle et al. | |
| 5,450,086 A | 9/1995 | Kaiser | |
| 5,465,099 A | 11/1995 | Mitsui et al. | |

(Continued)

OTHER PUBLICATIONS

Transaction History of related U.S. Appl. No. 12/123,826, filed May 20, 2008, entitled "RFID Device Using Single Antenna for Multiple Resonant Frequency Ranges."

(Continued)

*Primary Examiner*—Toan N Pham
(74) *Attorney, Agent, or Firm*—Lerner, David, Littenberg, Krumholz & Mentlik, LLP

(57) ABSTRACT

Methods and systems of RFID tags using RFID circuits and antennas having unmatched frequency ranges. At least some of the illustrative embodiments are RFID tags comprising a RFID circuit configured to operate with an antenna having a first range of resonant frequencies, a tag antenna coupled to the RFID circuit (the tag antenna having a range of resonant frequencies different than the first range of resonant frequencies, the range of resonant frequencies of the tag antenna being a second range of resonant frequencies).

19 Claims, 2 Drawing Sheets

U.S. PATENT DOCUMENTS

| | | | |
|---|---|---|---|
| 5,467,099 | A | 11/1995 | Bonebright et al. |
| 5,491,484 | A | 2/1996 | Schuermann |
| 5,491,715 | A | 2/1996 | Flaxl |
| 5,512,910 | A | 4/1996 | Murakami et al. |
| 5,528,222 | A | 6/1996 | Moskowitz et al. |
| 5,537,105 | A | 7/1996 | Marsh et al. |
| 5,561,435 | A | 10/1996 | Naibandian et al. |
| 5,572,226 | A | 11/1996 | Tuttle |
| 5,598,169 | A | 1/1997 | Drabeck |
| 5,606,323 | A | 2/1997 | Heinrich et al. |
| 5,617,060 | A | 4/1997 | Wilson et al. |
| 5,621,412 | A | 4/1997 | Sharpe et al. |
| 5,649,295 | A | 7/1997 | Shober et al. |
| 5,649,296 | A | 7/1997 | MacLellan et al. |
| 5,682,143 | A | 10/1997 | Brady et al. |
| 5,726,630 | A | 3/1998 | Marsh et al. |
| 5,771,021 | A | 6/1998 | Veghte |
| 5,838,235 | A | 11/1998 | Thorigne |
| 5,842,118 | A | 11/1998 | Wood, Jr. |
| 5,889,478 | A | 3/1999 | Minesi |
| 5,900,808 | A | 5/1999 | Lebo |
| 5,923,298 | A | 7/1999 | Miyahara et al. |
| 5,942,977 | A | 8/1999 | Palmer et al. |
| 5,959,357 | A | 9/1999 | Korman |
| 6,028,564 | A | 2/2000 | Duan et al. |
| 6,037,907 | A | 3/2000 | Ha et al. |
| 6,122,494 | A | 9/2000 | Tuttle |
| 6,130,602 | A | 10/2000 | O'Toole et al. |
| 6,177,872 | B1 | 1/2001 | Kodukula et al. |
| 6,184,841 | B1 | 2/2001 | Shober et al. |
| 6,192,222 | B1 | 2/2001 | Greeff et al. |
| 6,239,765 | B1 | 5/2001 | Johnson et al. |
| 6,243,012 | B1 | 6/2001 | Shober |
| 6,317,027 | B1 | 11/2001 | Watkins |
| 6,329,139 | B1 | 12/2001 | Nova et al. |
| 6,329,915 | B1 | 12/2001 | Brady |
| 6,356,535 | B1 | 3/2002 | Smith |
| 6,362,737 | B1 | 3/2002 | Rodgers et al. |
| 6,411,212 | B1 | 6/2002 | Hecht et al. |
| 6,574,454 | B1 | 6/2003 | Tuttle |
| 6,611,691 | B1 | 8/2003 | Zhou et al. |
| 6,717,923 | B1 | 4/2004 | Smith |
| 6,738,025 | B2 | 5/2004 | Carrender |
| 6,825,773 | B1 | 11/2004 | O'Toole |
| 6,885,353 | B2 | 4/2005 | Kurihara |
| 7,026,935 | B2 | 4/2006 | Diorio et al. |
| 7,075,901 | B2 | 7/2006 | Smith |
| 7,091,860 | B2 * | 8/2006 | Martinez de Velasco Cortina et al. .................... 340/572.1 |
| 7,132,946 | B2 * | 11/2006 | Waldner et al. .......... 340/572.1 |
| 7,327,257 | B2 | 2/2008 | Posamentier |
| 2004/0178912 | A1 | 9/2004 | Smith |
| 2005/0088354 | A1 | 4/2005 | Chang |
| 2006/0202827 | A1 * | 9/2006 | Volpi et al. ............... 340/572.1 |
| 2007/0018904 | A1 | 1/2007 | Smith |
| 2007/0290807 | A1 | 12/2007 | Smith |
| 2009/0015407 | A1 | 1/2009 | Tuttle |
| 2009/0278688 | A1 | 11/2009 | Tuttle |
| 2009/0289771 | A1 | 11/2009 | Tuttle |

OTHER PUBLICATIONS

Press Release, Chartered Semiconductor Manufacturing, Toppan Announces Vlume Production of Next-Generation RFID Chip, Japan and Singapore, Jul. 8, 2003, (3pp).

Tron Architecture Designed by Ken Sakamura, TRON News Items for Jan. 2004, "Ubiquitoous ID-Tagged Produce Goes on Sale in Japan" and "NEC to Get into the IC Tag Business", (2pp).

Tuttle, John R., U.S. Appl. No. 08/806,158, filed Feb. 25, 1997, now abandoned.

Peng, Chen et al., "The Analysis and Design of a Novel Passive Reflection Modulation Tag," IEEE Proceedings of the 4th International Conference on Microwave and Millimeter Wave Technology, pp. 402-405, Aug. 2004.

Turner, Chris, "Backscatter Modulation of Impedance Modulated RFID Tags," located at www.rfip.eu/backscatter_tag_link_budget_and_modulation_at_reader_receiver.pdf, Feb. 2003.

Transaction History of related U.S. Appl. No. 09/020,595, filed Feb. 4, 1998, entitled "Communications Devices, Communication Systems and Methods of Communication," now U.S. Patent No. 6,356,535.

Transaction History of related U.S. Appl. No. 09/389,534, filed Sep. 2, 1999, entitled "Remote Communication Devices, Radio Frequency Identification Devices, Wireless Communication Systems, Wireless Communication Methods, Radio Frequency Identification Device Communication Methods, and Methods of Forming a Remote Communication Device," now abandoned.

Transaction History of related U.S. Appl. No. 09/449,031, filed Nov. 24, 1999, entitled "Communications Devices, Communication Systems and Methods of Communicating," now U.S. Patent No. 6,717,923.

Transaction History of related U.S. Appl. No. 10/075,791, filed Feb. 12, 2002 entitled "Communication Systems, Communication Apparatuses, Radio Frequency Communication methods, Methods of Communicating Using a Radio Frequency Communication System, and Methods of Forming a Radio Frequency Communication Device," now U.S. Patent No. 7,075,901.

Transaction History of related U.S. Appl. No. 10/791,187, filed Mar. 1, 2004, entitled "Remote Communication Devices, Radio Frequency Identification Devices, Wireless Communication Systems, Wireless Communication Methods, Radio Frequency Devices Communication Methods, and Methods of Forming a Remote Communication Device."

Transaction History of related U.S. Appl. No. 11/483,198, filed Jul. 7, 2006, entitled "Communications Devices, Communication Systems and Methods of Communicating.".

Transaction History of related U.S. Appl. No. 11/777,843, filed on Jul. 13, 2007, entitled "RFID Tags and Methods of Designing RFID Tags."

Transaction History of related U.S. Appl. No. 11/847,611, filed Aug. 30, 2007, entitled "Remote Communication Devices, Radio Frequency Identification Devices, Wireless Communication Systems, Wireless Communication Methods, Radio Frequency Identification Device Communication Methods, and Methods of Forming a Remote Communication Device."

Transaction History of related U.S. Appl. No. 12/123,826, filed May 20, 2008, entitled "RFID Device Using Single Antenna for Multiple Resonant Frequency Ranges.".

* cited by examiner

METHODS AND SYSTEMS OF RFID TAGS USING RFID CIRCUITS AND ANTENNAS HAVING UNMATCHED FREQUENCY RANGES

BACKGROUND

1. Field

This disclosure is directed to radio frequency identification (RFID) tags using RFID circuits and antennas having unmatched frequency bands.

2. Description of the Related Art

RFID tags comprise RFID circuits and tag antennas. Each conventional RFID circuit is designed for use in a particular band of frequencies. For example, because of mandates of many large retail chain stores, RFID tags operating in the 860-960 Mega-Hertz (MHz) band of frequencies (and operating under a communication protocol promulgated by EPCglobal Inc.) are particularly prevalent. In some cases, the volume of RFID circuits operable in the mandated systems has pushed pricing for RFID circuits to five cents a piece or less, and thus correspondingly the RFID tags are relatively inexpensive.

However, the physical size of a tag antenna used on a RFID tag, and thus the physical size of the RFID tag itself, is a function of the frequency of operation of the tag. In the 860-960 MHz band of frequencies, quarter-wave tag antennas are on the order of three to four inches, and thus RFID tags operating in this band have at least one dimension spanning three to four inches. In some situations, however, a RFID tag having a three to four inch dimension is too long for the underlying object. RFID tags may be made smaller by re-design of the RFID circuit and tag antenna for a new, higher operating frequencies, but such a design change is prohibitively expensive, especially where the volume of RFID tags to be produced is relatively small in comparison to the engineering costs associated with RFID circuit re-design efforts.

BRIEF DESCRIPTION OF THE DRAWINGS

For a detailed description of various embodiments, reference will now be made to the accompanying drawings in which.

NOTATION AND NOMENCLATURE

Certain terms are used throughout the following description and claims to refer to particular system components. As one skilled in the art will appreciate, design and manufacturing companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or direct connection. Thus, if a first device couples to a second device, that connection may be through a direct connection or through an indirect connection via other intermediate devices and connections. Moreover, the term "system" means "one or more components" combined together. Thus, a system can comprise an "entire system," "subsystems" within the system, a radio frequency identification (RFID) tag, a RFID reader, or any other device comprising one or more components.

Throughout the specification and claims, reference is made to multiple bands of frequencies or multiple ranges of resonant frequencies. In the specification and in the claims, when multiple bands or multiple ranges are discussed or claimed as "different", the bands or ranges may have some overlap, but "different" does not include one band or range being fully encompassed by a second band or range. Stated otherwise, where bands or ranges are different, the series of frequencies within a first band or first range have at least some frequencies that are not part of a second band or second range. Moreover, the terms band or bands are used interchangeably with the term range.

DETAILED DESCRIPTION OF DISCLOSED EMBODIMENTS

Figure 1:
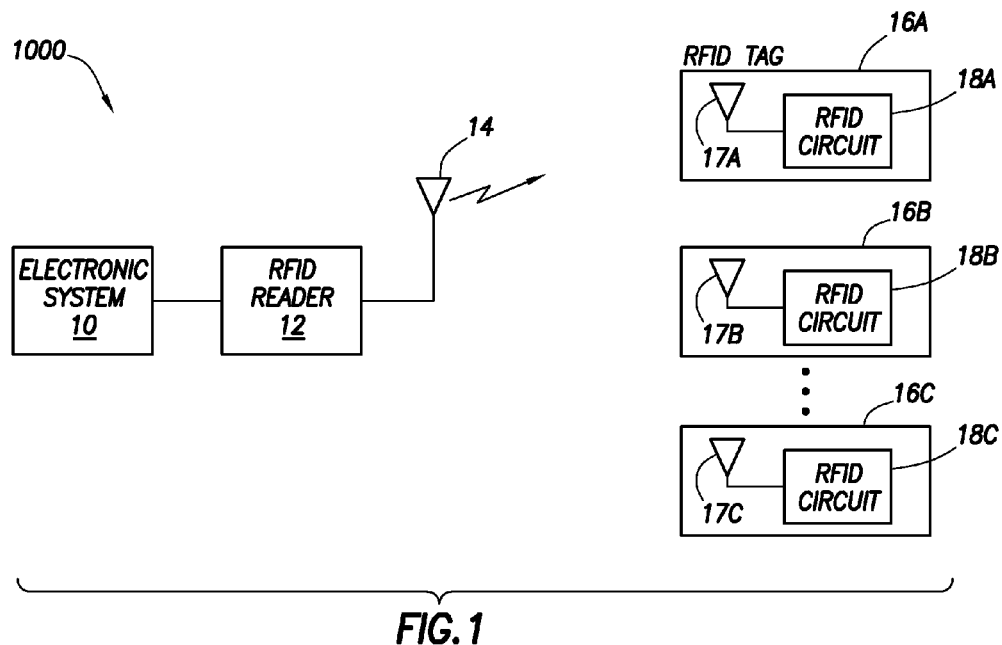
FIG. 1 shows a radio frequency identification (RFID) system in accordance with at least some embodiments.

FIG. 1 illustrates a system 1000 in accordance with at least some embodiments. In particular, system 1000 comprises an electronic system 10 (e.g. a computer system) coupled to a radio frequency identification (RFID) reader 12. The RFID reader 12 may be equivalently referred as an interrogator. By way of antenna 14, the RFID reader 12 communicates with one or more RFID tags 16A-16C proximate to the RFID reader (i.e., within communication range).

Considering a single RFID tag 16A (but the description equally applicable to all the RFID tags 16), the communication sent by the RFID reader 12 is received by tag antenna 17A, and passed to the RFID circuit 18A. If the communication from the RFID reader triggers a response, the RFID circuit 18A sends to the RFID reader 12 the response (e.g. a tag identification value, or data held in the tag memory) using the tag antenna 17A. The RFID reader 12 passes data obtained from the various RFID tags 16 to the electronic system 10, which performs any suitable function. For example, the electronic system 10, based on the data received from the RFID tags 16, may allow access to a building or parking garage, note the entrance of an employee to a work location, direct a parcel identified by the RFID tag 16 down a particular conveyor system, or track the movement of poultry.

There are several types of RFID tags operable in the illustrative system 1000. For example, RFID tags 16 may be semi-active tags. Semi-active tags have an internal battery or power source, but a semi-active tag remains dormant (i.e., powered-off or in a low power state) most of the time. When an antenna of a semi-active tag receives an interrogating signal, the power received is used to activate the semi-active tag, and a response (if any) is sent by modulating the radio frequency backscatter from the tag antenna, with the semi-active tag using power for internal operations from its internal power source. In particular, the RFID reader 12 and antenna 14 continue to transmit power after the RFID tag is awake. While the RFID reader 12 transmits, the tag antenna 17 is selectively tuned and de-tuned with respect to the carrier frequency. When tuned, significant incident power is absorbed by the tag antenna 17. When de-tuned, significant power is reflected by the tag antenna 17 to the antenna 14 of the RFID reader 12. The RFID reader 12 reads the data or identification value from the backscattered electromagnetic waves. Thus, in this specification and in the claims, the terms "transmitting" and "transmission" include not only broadcasting from an antenna using internally sourced power (such as by the RFID reader), but also sending in the form of backscattered electromagnetic waves.

A second type of RFID tag is a passive tag, which, unlike semi-active RFID tags, has no internal power source. The tag antenna 17 of the passive RFID tag receives an interrogating signal from the RFID reader, and the power extracted from the received interrogating signal is used to power the tag. Once powered, the passive RFID tag may accept a command, send a response comprising a data or identification value, or both; however, like the semi-active tag the passive tag sends the response in the form of backscattered radio frequency signals.

Figure 2:
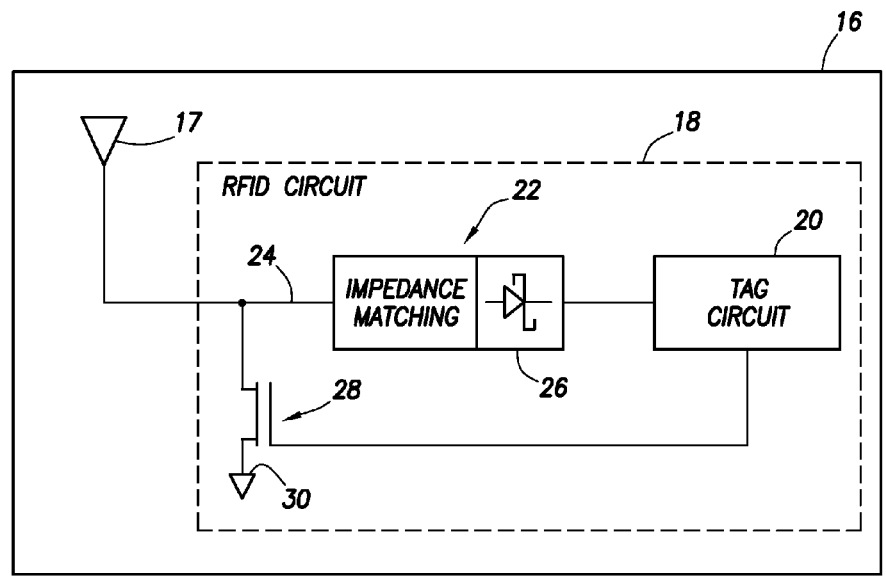
FIG. 2 shows a RFID tag in greater detail.

FIG. 2 shows a more detailed view of the RFID tag 16 in accordance with at least some embodiments. In particular, the RFID tag 16 comprises tag antenna 17 coupled to the tag circuit 20 by way of an impedance matching circuit 22. The tag antenna 17 is designed to operate (i.e., designed to be resonant) at a particular frequency or a band of frequencies. For example, tag antenna 17 may be designed and constructed to operate in a 100 MHz wide band centered at 910 MHz. Similarly, the tag antenna may be designed and constructed to operate in a 100 MHz wide band centered at 2.45 Giga-Hertz (GHz) or 5.8 GHz. Moreover, the tag antenna 17 has characteristic impedance, which for modular antennas may span from about 50 to 75 Ohms. In order to ensure adequate power transfer between the tag antenna 17 and remaining portions of the RFID circuit 18, the tag antenna 17 may be coupled to an impedance matching circuit 22 of the RFID circuit 18. The impedance matching circuit has impedance (as viewed from input terminal 24) that is substantially the same as the impedance of the tag antenna 17. While matching is a concern for all tags, matching is a particular concern for passive tags as the power received by the tag antenna 17 is used to power the tag circuit 20. It is noted, however, that not all tags have separate impedance matching circuits.

Still referring to FIG. 2, in addition to the impedance matching circuit 22 present in some embodiments, the RFID circuit 18 also comprises a down-converter circuit 26. The down-converter circuit 26 enables two functions: down-conversion of signals from the RFID reader 12; and rectification of power received by the antenna to wake (and in the case of passive tags, to power) the tag circuit 20. With respect to waking and/or powering of the tag circuit, the signals induced on the tag antenna 17 by incident electromagnetic waves are alternating current (AC) signals at the carrier frequency; however, the tag circuit 20 operates using direct current (DC). Thus, the down-converter circuit 26 rectifies the signals induced on the tag antenna 17 to produce a DC power signal, which then may be used (with or without further voltage regulation) to power the tag circuit 20. Rectification to produce the DC signal is accomplished within the down-converter circuit 26 in some embodiments by way of a single diode (e.g., a Shottky diode), or a set of diodes in a full-wave bridge configuration. With respect to the down-conversion aspects of the down-converter circuit 26, communications from a RFID reader 12 to the RFID tag 16 use on-off keying of the carrier frequency by the RFID reader 12. To extract the data from the keyed carrier, the down-converter circuit 26 rectifies the signal induced on the tag antenna and applies the rectified signal to a resistive-capacitive (RC) circuit whose time constant is selected to ensure the data can be extracted at expected data rate.

The RFID tag 16 further comprises a switch 28 coupled at the base of the tag antenna 17 and input terminal 24 of the impedance matching circuit 22. The switch is configured to selectively couple the tag antenna to common 30 at the command of the tag circuit 20. In particular, when the RFID tag 16 is communicating to the RFID reader in the form of backscattered electromagnetic waves, the tag circuit 20 selectively tunes and de-tunes the tag antenna 17 by selectively coupling the tag antenna 17 to the common 28 through the switch 26. In some embodiments, the impedance matching circuit 22, down-converter circuit 26, tag circuit 20 and switch 22 are all manufactured on the same substrate, yet in other embodiments these circuits are individual components electrically coupled together.

Various embodiments described herein are directed to using RFID circuits in systems for which the RFID circuits were not initially designed or intended to operate. For example, because of wide spread availability, RFID circuits designed for use in the 860 to 960 MHz band of frequencies are relatively inexpensive. At least some embodiments described herein use the RFID circuits that were designed for the 860 to 960 MHz band of frequencies in other frequency bands (e.g., bands centered at 2.45 GHz or 5.8 GHz) that operate in the same protocol to leverage the low cost of the RFID circuits. Moreover, using the RFID circuits at higher frequencies enables the use of smaller antennas. Using RFID circuits in systems for which they were not intended (i.e., using the circuits out of specification) is, in some embodiments, based on a combination of two realizations regarding RFID circuits: 1) down-conversion in RFID circuits is direct base-band conversion; and 2) because of the technology used in constructing Shottky diodes for lower frequency bands, those diodes may be operational in higher bands (and vice-versa). Each of these realizations is discussed in turn.

Considered first is direct base-band conversion. In systems using superheterodyne receivers, the original modulated carrier containing the modulated data is down-shifted in frequency to an intermediate frequency. Using the intermediate frequency version of the carrier, demodulation takes place. Creating the intermediate frequency version of the carrier involves multiplying the original modulated carrier by a locally generated sinusoid (from a local oscillator). Multiplication of two sinusoids results in at least two sinusoids, one having a frequency being the addition of the frequencies of the multiplied sinusoids, and another having a frequency being the subtraction of the frequencies of the multiplied sinusoids. In most cases, the lower frequency resultant sinusoid is the intermediate frequency. Because the intermediate frequency is related to the original carrier frequency, and because circuitry that demodulates the intermediate frequency is designed for particular intermediate frequencies, designers of conventional radio frequency communication systems do not consider using radio frequency circuits and equipment for frequencies other than for which they were specifically designed, because to do so renders the systems inoperable due to changes in resultant intermediate frequency. However, as described above, the down-conversion used in RFID circuits is a direct base-band conversion (i.e., in the process of the down-conversion, the original carrier is stripped away and the data emerges directly). Thus, contrary to conventional practice, from a demodulation standpoint the original modulated carrier frequency is immaterial to the down-conversion and demodulation process in RFID circuits.

The specification now turns to a consideration of the diodes used in RFID circuits. In most, if not all, RFID circuits, the diodes used in the down-converter circuit 26 are Schottky diodes. Schottky diodes use a metal-semiconductor junction as the barrier (as opposed to semi-conductor to semi-conductor junctions in other diodes). Because of the metal-semiconductor junction and other factors, Schottky diodes have very low forward voltage drop (e.g. on the order of 0.2 Volts) at very low forward bias currents (e.g. one milli-Amp). In certain ranges of frequencies (e.g. approximately 800 MHz to 5.8 GHz), the limiting factor in frequency performance of Schottky diodes is the inherent capacitance at the metal-semiconductor junction.

In designing the Schottky diodes for use in RFID circuits, the primary design factor is current carrying capability. That is, the diode or diodes are sized to carry sufficient electrical current during the waking/charging phase to charge one or more capacitors, which capacitors then power the tag circuit during the communication phase. By virtue of the low power requirements for tag circuits, the size of diodes (i.e., the area of contact between the metal and the semiconductor) is relatively small. The inventor of the present specification has found that the inherent capacitance of the Schottky diodes used in RFID circuits is, because of their size, very low. The very low capacitance enables the Schottky diodes to operate at frequencies well beyond that for which the overall RFID circuit as a whole was designed. For example, in RFID circuits designed for use in the 860 to 960 MHz band, the Schottky diodes are also operational at higher frequencies (e.g. bands centered at 2.45 GHz or 5.8 GHz).

Returning now to FIG. 2. In accordance with at least some embodiments, the RFID circuit 18 (including the impedance matching circuit 22 when present and down-converter circuit 26) is designed to operate with an antenna having a first range of resonant frequencies (i.e., the RFID circuit is designed for systems operating within a particular band of frequencies). However, the tag antenna 17 has a range of resonant frequencies different than the particular band of frequencies for which the RFID circuit is designed to operate (i.e., the tag antenna 17 is designed for systems operating within a band of frequencies different than the particular band of frequencies). However, the tag antenna 17, while designed to be resonant in a different band of frequencies than for which the RFID circuit was designed, may be selected/designed to have a characteristic impedance that is substantially the same as the impedance matching circuit 22.

Consider, as a non-limited example, that the RFID circuit 18 is designed for use in a 100 MHz wide band of frequencies centered at 910 MHz, and that the impedance of the impedance matching circuit 22 is 50 Ohms. Such an RFID circuit 18, in accordance with at least some embodiments, may be coupled to a tag antenna 17 configured for use in a 100 MHz wide band of frequencies centered at 2.45 GHz and having a characteristic impedance of 50 Ohms. Because the original carrier is immaterial to the down-conversion process in the down-converter circuit 26, and because the diodes in the down-converter circuit 26 are operational at the higher frequencies, the RFID tag 16 is operational in a different band of frequencies than for which the RFID circuit was designed to operate.

Figure 3:
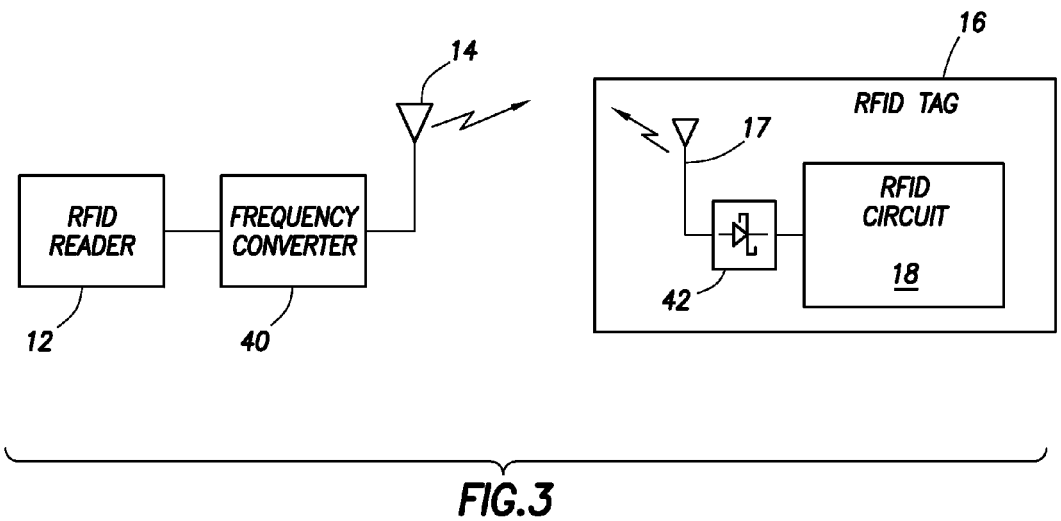
FIG. 3 show a RFID system in accordance with other embodiments.

FIG. 3 shows a system illustrating several other embodiments. In one aspect, FIG. 3 illustrates a system where the RFID reader 12 is configured to operate in a first band of frequencies, but the band of frequencies in which electromagnetic signals are broadcast is different than the frequencies for which the RFID reader 12 is designed. In particular, RFID reader 12 may be configured to operate in a 100 MHz wide band of frequencies centered at 910 MHz. Frequency converter 40 accepts signals from the RFID reader 12, and converts the signals to the band of frequencies in which the electromagnetic signals are to be broadcast. For example, in some embodiments the frequency converter may use a heterodyning system to increase the frequency of the signal supplied by the RFID reader, then couple the increased-frequency signal to the reading antenna 14. With regard to signals received by the reading antenna 14, the frequency converter 40 may use a heterodyning system to decrease the frequency received from RFID tag 16, then couple the decreased-frequency signal to the RFID reader 12. In some embodiments, the frequency converter 40 may perform the heterodyning in a full duplex manner. Thus, RFID readers 12 designed for operating in one band of frequencies may be used in other bands of frequencies without internal modification.

In another aspect FIG. 3 illustrates alternative embodiments of RFID tag 16. In particular, there may be situations where the RFID circuit 18 is unable to operate at higher frequencies than for which it was designed (e.g., the change in frequency is beyond that which Schottky diodes of the RFID circuit can operate, or the RFID circuit uses non-Schottky diodes, and thus is limited in frequency performance). Such RFID circuits may still be used in the various embodiments by use of a front-end rectifier circuit 42. In particular, the rectifier circuit 42 may couple between the tag antenna 17 and the RFID circuit 18. The rectifier circuit 42 may comprise at least one diode (e.g., a Schottky diode) operable at the frequency used for broadcasting electromagnetic waves. In some embodiments, the rectifier circuit 42 is a single diode, but in other embodiments the rectifier circuit comprises a full-wave bridge. Thus, in the embodiments of the RFID tag 16 of FIG. 3, a RFID circuit 18 designed for operating in a first band of frequencies may be used in a system operating in a second band of frequencies, different from the first.

The various embodiments discussed to this point have focused on use of RFID circuits in bands of frequencies different than for which they were initially intended, and without modification to the RFID circuits. However, other embodiments leverage the discoveries of this specification to modify existing RFID circuits to operate at new frequencies. In particular, the engineering design of a RFID circuit involves significant expense (i.e., on the order of millions of dollars). However, now understanding the principle of the direct down-conversion of RFID circuits and how such down-conversion renders immaterial the actual operating frequency, for RFID circuits that are not operable in higher frequency bands because of the switching frequency of various components, a RFID circuit in accordance with these other embodiments may be designed, and thereafter constructed, by starting with a fully designed RFID circuit, and modifying only the portions that limit higher frequency operation (e.g., the diodes in the down-converter circuit) to be operational at the new, higher operating frequencies. In these embodiments then, a RFID circuit specifically designed for operation in a particular band of frequencies may be designed at a fraction of the cost of a complete design.

Figure 4:
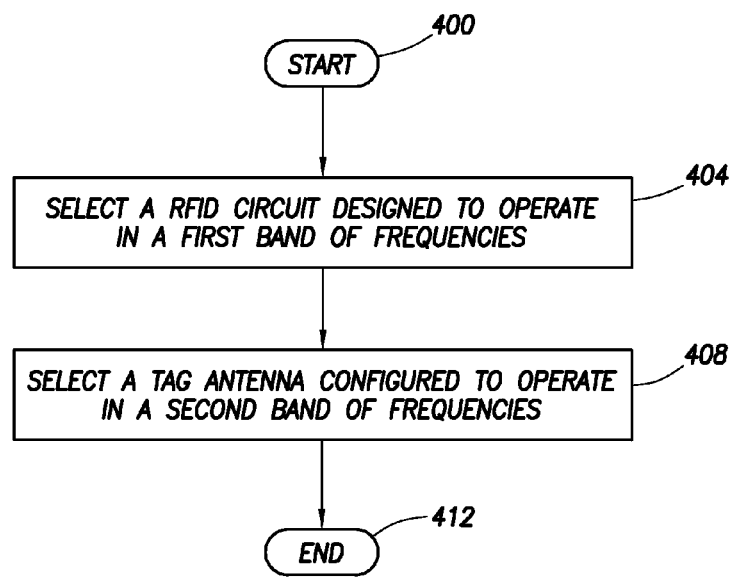
FIG. 4 shows a method in accordance with at least some embodiments.

FIG. 4 illustrates a method of designing a RFID tag in accordance with at least some embodiments. In particular, the method starts (block 400) and proceeds to selecting an RFID circuit designed to operate in a first band of frequencies (block 404). Selecting a RFID circuit may take many forms. In some embodiments, selecting a RFID circuit involves selecting a previously designed and manufactured RFID circuit, which may be used directly. In other embodiments, selecting involves taking a previous RFID circuit design, modifying the down-converter circuit to be operational in a second band of frequencies, and then manufacturing using the modified RFID circuit design. Regardless of whether the RFID circuit is a previous unmodified or modified design, the next step in the illustrative method is selecting a tag antenna configured to operate in the second band of frequencies (block 408) different than the first band of frequencies, and the illustrative method ends (block 412).

The above discussion is meant to be illustrative of the principles and various embodiments of the present invention.

Numerous variations and modifications will become apparent to those skilled in the art once the above disclosure is fully appreciated. For example, though the various embodiments are discussed with respect to using a RFID circuit in systems operating at frequencies above the frequency for which the RFID circuit was designed, the RFID circuits may likewise be used in systems operating at frequencies below the frequency for which the RFID circuit was designed. Moreover, multiple antennas may be used by the RFID tag and/or the RFID reader to utilize the higher/lower frequency bands. It is intended that the following claims be interpreted to embrace all such variations and modifications.

What is claimed is:

1. A radio frequency identification (RFID) tag comprising:
    a RFID circuit configured to operate in a first range of resonant frequencies;
    a tag antenna coupled to the RFID circuit, the tag antenna having a range of resonant frequencies different than the first range of resonant frequencies, the range of resonant frequencies of the tag antenna being a second range of resonant frequencies; and
    a rectifier circuit coupled between the RFID circuit and the tag antenna, wherein the rectifier circuit is configured to be operable at the second range of resonant frequencies and enables the RFID circuit to operate in the second range of resonant frequencies.

2. The RFID tag according to claim 1 wherein the rectifier further comprises a diode.

3. The RFID tag according to claim 1 wherein the RFID circuit further comprises:
    a tag circuit configured to participate in a protocol for communications with a RFID reader;
    a matching circuit coupled to the tag circuit, the matching circuit designed to operate with an antenna having the first range of resonant frequencies.

4. The RFID tag according to claim 1 wherein the first range of resonant frequencies is approximately 860 to 960 Mega Hertz, and the second range of frequencies has at least one frequency that is higher than the first range of frequencies.

5. The RFID tag according to claim 1 wherein the second range of frequencies is approximately 860 to 960 Mega Hertz, and the first range of frequencies has at least one frequency that is higher than the second range of frequencies.

6. A system comprising:
    a radio frequency identification (RFID) reading system comprising:
        a RFID reader; and
        a reading antenna coupled to the RFID reader, the reading antenna configured to operate within a first band of frequencies;
    a RFID tag comprising:
        a RFID circuit configured to operate with RFID reading systems that operate in a second band of frequencies different than the first band of frequencies;
        a tag antenna coupled to the RFID circuit, the tag antenna configured to operate in the first band of frequencies; and
        a rectifier circuit coupled between the RFID circuit and the tag antenna, wherein the rectifier circuit is configured to operate at the first band of resonant frequencies and enables the RFID circuit to operate in the first band of resonant frequencies.

7. The system according to claim 6 wherein the RFID reader is configured to operate in the second band of frequencies.

8. The system according to claim 7 wherein RFID reading system further comprises a converter circuit coupled between the RFID reader and the reading antenna, wherein the converter circuit is configured to convert signals from the first band frequencies to the second band of frequencies.

9. The system according to claim 8 wherein the converter circuit is configured to convert signals using a heterodyning system.

10. The system according to claim 6 wherein the RFID circuit further comprises a tag circuit configured to participate in a protocol for communications with the RFID reader, and wherein at least one aspect of the protocol is present in both the first band and second band.

11. The system according to claim 10 wherein the RFID circuit further comprises a matching circuit coupled to the tag circuit, the matching circuit configured to operate with an antenna resonant in the first band of frequencies.

12. The system according to claim 6 wherein the first band of resonant frequencies is approximately 860 to 960 Mega Hertz, and the second band of frequencies is higher than the first band of frequencies.

13. The system according to claim 6 wherein the second band of frequencies is approximately 860 to 960 Mega Hertz, and the first band of frequencies is higher than the first band of frequencies.

14. A method to design a radio frequency identification (RFID) tag comprising:
    selecting an RFID circuit designed to operate in a first band of frequencies;
    selecting a tag antenna configured to operate in a second band of frequencies, the second band of frequencies different than the first band of frequencies; and
    selecting a rectifier circuit to be coupled between the RFID circuit and the tag antenna, the rectifier circuit configured to be operable in the second band of frequencies and enabling the RFID circuit to operate in the second band of frequencies.

15. The method according to claim 14 further comprising, after selecting the RFID circuit, modifying a down-converter circuit of the RFID circuit to be operable in the second band of frequencies.

16. The method according to claim 14 wherein selecting the tag antenna further comprises designing a tag antenna to have a characteristic impedance to substantially match an impedance of a matching circuit portion of the RFID circuit, and further designing the antenna to be resonant in the second band of frequencies.

17. A radio frequency identification (RFID) tag comprising:
    a means for participating in a protocol for communications with a RFID reader means;
    a means for impedance matching, the means for impedance matching coupled to the means for participating;
    a means for broadcasting electromagnetic waves coupled to the means for impedance matching, the means for broadcasting configured for operation in a first band of frequencies; and
    a means for rectifying coupled between the mean for impedance matching and the means for broadcasting;
    wherein the means for participating and the means for impedance matching are designed for use in systems operating in a second band of frequencies different than the first band of frequencies and further wherein the means for rectifying is configured to operate at the first band of resonant frequencies and enables the means for participating to be in the first band of frequencies.

18. The RFID tag according to claim 17 wherein the first band of frequencies is approximately 860 to 960 Mega Hertz, and the second band of frequencies is higher than the first range of frequencies.

19. The RFID tag according to claim 17 wherein the second band of frequencies is approximately 860 to 960 Mega Hertz, and the first band of frequencies is higher than the first range of frequencies.

* * * * *